(No Model.)
G. DE BEAULIEU.
AUTOMATIC CAR COUPLING.
No. 319,200. Patented June 2, 1885.
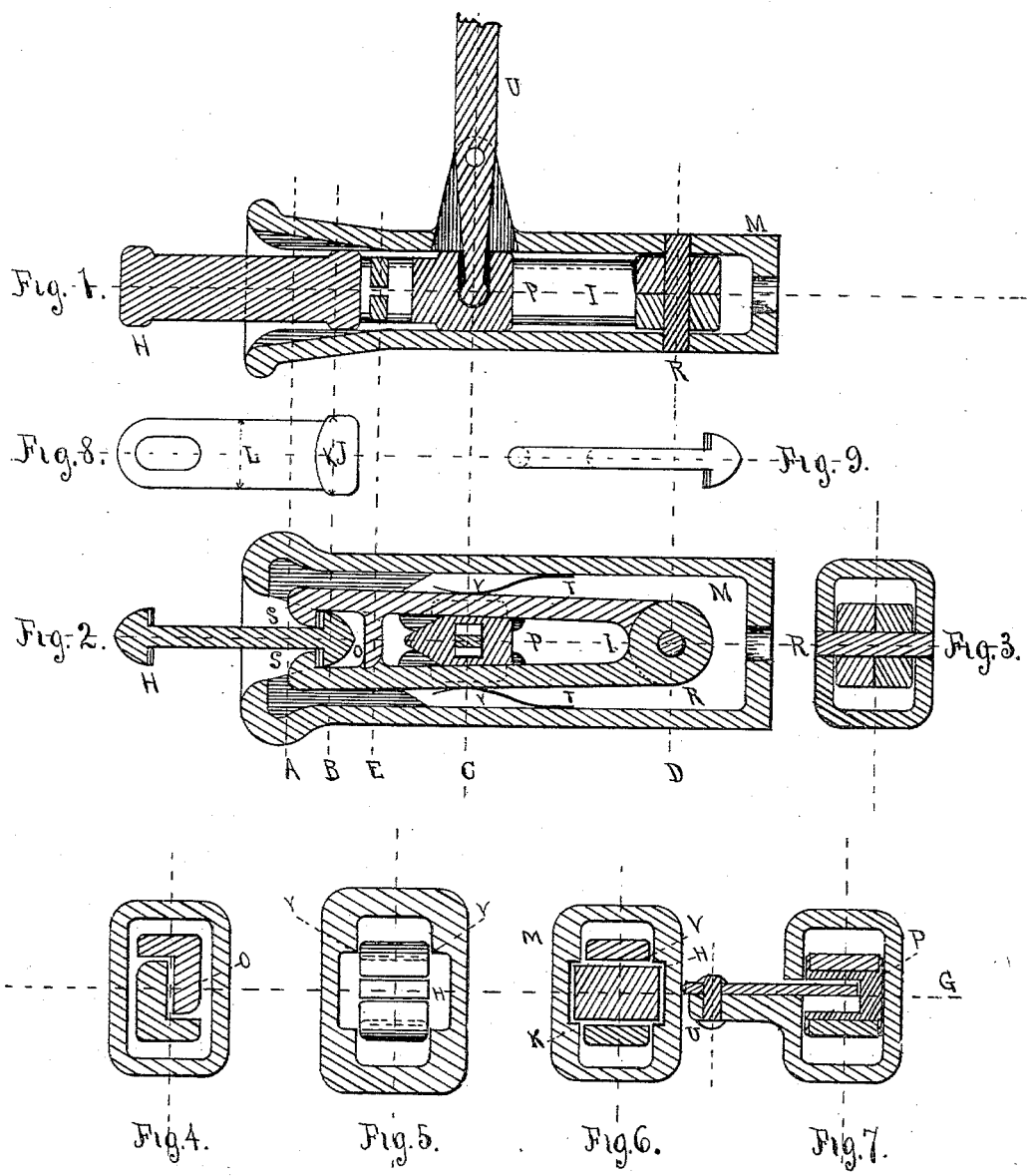
Witnesses
Leslie H. Colburn
Marshall O. Waggoner
Inventor
George De Beaulieu,
by H. J. Colburn
Attorney.

UNITED STATES PATENT OFFICE.

GEORGE DE BEAULIEU, OF TOLEDO, OHIO, ASSIGNOR OF ONE-HALF TO JOHN CUMMINGS, OF SAME PLACE.

AUTOMATIC CAR-COUPLING.

SPECIFICATION forming part of Letters Patent No. 319,200, dated June 2, 1885.

Application filed January 21, 1885. (No model.)

*To all whom it may concern:*

Be it known that I, GEORGE DE BEAULIEU, a citizen of the United States, residing at Toledo, in the county of Lucas and State of Ohio, have invented certain new and useful Improvements in Car-Couplings, of which the following is a description.

The object of my invention is a self-acting car-coupling which will engage and securely lock with another of the same construction, and which will admit a range of variation caused by the different heights of cars to which said couplings are applied, and which is adapted to be unlocked from the side or from the top of the car by suitable connecting mechanism. I attain these objects by the mechanism illustrated in the accompanying drawings, in which—

Figure 1 is a horizontal section of the entire couplings on line G, Fig. 7. Fig. 2 is a vertical section of the entire coupling on line A, Fig. 5. Fig. 3 is a section on line D, Figs. 1 and 2. Fig. 4 is a section on line E, Figs. 1 and 2. Fig. 5 is a section on line A, Figs. 1 and 2. Fig. 6 is a section on line B, Figs. 1 and 2. Fig. 7 is a section on line C, Figs. 1 and 2. Fig. 8 is a plan of a link, one end of which is adapted to be used with my improved coupling, and the other end is adapted to be used with the old-style draw-bar, in which the connection is made in a well-known manner. Fig. 9 is a side view of Fig. 8.

This improved coupling is adapted to receive and I use with it the common anchor-head link, various sections of which are shown at H in Figs. 1, 2, 5, and 6. The face of the said anchor-head link H, which engages with the jaws of the compound bifurcated coupling-bar I, is made convex in form, as shown at J, Fig. 8. This is to give freedom of movement and prevent abrasion of the contacting faces of the said link H and coupling-bar I. The anchor-head of the link H is made broader (as shown at K) than the main body of the link at L. The object of this is, that the said head may serve as a guide to the link H as it enters the coupling-case M, as shown at K, Fig. 6, and the case is thickened at V, forming ways for said head to slide between. The coupling-bar I has on the line E, Fig. 2, a pair of lugs, O, which are shown in section in Fig. 4. These lugs overlap each other and prevent the link H contacting with the block P, Figs. 1, 2, and 7. The coupling-bar I is pivoted to the main case M at R, and is opened by forcing the anchor-headed link H between the jaws S, and is closed by the action of the springs T upon the arms of the coupling-bar I.

P is a sliding block, which is operated by means of the lever U, which lever U is in this instance connected to the case M, but may be connected in any suitable way to the car-frame upon which this coupling is used. The sliding block P slides upon and operates to open the arms of the coupling-bar I for the purpose of releasing the link H. This mechanism, with the exception of the link H, is wholly contained within the iron case M, and is by this means protected against rough usage and breakage.

I am aware that prior to my invention car-couplings of various designs having the anchor-headed link, the pivoted double coupling-bar, combined with cases of various forms, have been known and used. I therefore do not claim such a combination, broadly; but What I do claim, and desire to secure by Letters Patent, is—

1. A car-coupling case having the guiding-lugs V, in combination with the anchor-headed link H and springs T, and rear pivotal and bifurcated coupling-bar I, said bar having overlapping lugs O, substantially as shown, and for the purpose described.

2. A car-coupling having the case M, link H, springs T, and the rear pivotal and bifurcated coupling-bar I, in combination with the sliding opening block P, substantially as shown, and for the purpose described.

GEORGE DE BEAULIEU.

Witnesses:
LESLIE H. COLBURN,
H. J. COLBURN.